(12) United States Patent
de Kleer

(10) Patent No.: US 8,401,988 B2
(45) Date of Patent: Mar. 19, 2013

(54) METHOD AND APPARATUS FOR MAINTAINING GROUPINGS AND RELATIONSHIPS OF PROPOSITIONS ASSOCIATED WITH A KNOWLEDGE BASE

(75) Inventor: Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 482 days.

(21) Appl. No.: 12/713,836

(22) Filed: Feb. 26, 2010

(65) Prior Publication Data
US 2010/0223224 A1 Sep. 2, 2010

Related U.S. Application Data

(60) Provisional application No. 61/156,770, filed on Mar. 2, 2009, provisional application No. 61/175,649, filed on May 5, 2009.

(51) Int. Cl.
*G06F 17/00* (2006.01)

(52) U.S. Cl. ......................................................... 706/50

(58) Field of Classification Search ........................ None
See application file for complete search history.

(56) References Cited

U.S. PATENT DOCUMENTS
5,088,048 A 2/1992 Dixon et al.

OTHER PUBLICATIONS

David Whitten, "The Unofficial, Uauthorized Cyc Frequently Asked Questions Information Sheet", 1997, www.robotwisdom.com/com/ai/cycfaq.html, pp. 1-17.*
de Kleer, An Assumption-based TMS, Artificial Intelligence 28 (1986) pp. 127-162.
de Kleer, A Hybrid Truth Maintenance System, Xerox Palo Alto Research Center, Dec. 22, 1994, 28 pages.
Companion Cognitive Systems, printed from http://www.qrg.northwestern.edu/ideas/companions-idea.htm, on Aug. 20, 2008, 3 pages.
Parmar et al., Representation of Actions in Cyc and KM, RKF PI Meeting, Formal Reasoning Group, Stanford University, Oct. 18, 2001, 13 pages.
Foundations of Knowledge Representation in Cyc, CyCorp, 2002, 15 pages.
Inference in Cyc, CyCorp, 2002, 14 pages.
Guha, Contexts: A Formalization and Some Applications, Ph.D. Thesis, Stanford University, Feb. 10, 1995, 148 pages.
Forbus et al., An analogy ontology for integrating analogical processing and first-principles reasoning, American Association for Artificial Intelligence, 2002, 8 pages.
Forbus et al., Self-Modeling in Companion Cognitive Systems: Current Plans, DARPA Workshop on Self-Aware Systems, Washington, D.C., 2004, 2 pages.
Forbus et al., Companion Cognitive Systems: A step towards human-level AI, AAAI Fall Symposium on Achieving Human-level Intelligence through Integrated Systems and Research, Washington, D.C., Oct. 2004, 5 pages.

* cited by examiner

*Primary Examiner* — Jeffrey A Gaffin
*Assistant Examiner* — Paulinho E Smith
(74) *Attorney, Agent, or Firm* — Fay Sharpe LLP

(57) ABSTRACT

The disclosure describes a method and apparatus for maintaining groupings and relationships of propositions associated with a knowledge base. In one embodiment, the method includes providing multiple microtheories to form a knowledge base. Each microtheory includes multiple propositions. An mt label is provided for each microtheory. A proposition label is provided for each proposition. The proposition label for a specific proposition is compared with the microtheory labels in response to a transaction request. Microtheory labels that have a common element with the proposition label are determined. In another embodiment, the method includes providing multiple microtheories, providing an mt label for each microtheory, and initializing tags for first and second microtheories to a clean value. In one embodiment, the apparatus may include one or more storage devices and a tag processing logic.

22 Claims, 5 Drawing Sheets

METHOD AND APPARATUS FOR MAINTAINING GROUPINGS AND RELATIONSHIPS OF PROPOSITIONS ASSOCIATED WITH A KNOWLEDGE BASE

CROSS REFERENCE TO RELATED PATENTS AND APPLICATIONS

This application claims the right of priority and benefit of the earlier filing date of U.S. Provisional Pat. App. Ser. No. 61/156,770 filed Mar. 2, 2009 and U.S. Provisional Pat. App. Ser. No. 61/175,649 filed May 5, 2009. The contents of both of these provisional applications are fully incorporated herein by reference.

BACKGROUND

The present application is directed to maintaining beliefs in propositions in conjunction with a reasoning system. A reasoning system is able to infer logical consequences from a set of asserted facts or axioms. The inference rules are commonly specified by means of an ontology language, and often a description language. Many reasoners use first-order predicate logic to perform reasoning; inference commonly proceeds by forward chaining and backward chaining. A reasoning system may include an inference engine, a truth maintenance system (TMS), and a knowledge base (KB).

An example of an existing reasoning system is known as Cyc, from CycCorp, Inc. of Austin, Tex. Cyc is an artificial intelligence (AI) project that attempts to assemble a comprehensive ontology and database of everyday common sense knowledge, with the goal of enabling AI applications to perform human-like reasoning. The project was started in 1984 by Doug Lenat as part of Microelectronics and Computer Technology Corporation. The name "Cyc" (from "encyclopedia", pronounced like psych) is a registered trademark owned by Cycorp, Inc. The original knowledge base is proprietary, but a smaller version of the knowledge base, intended to establish a common vocabulary for automatic reasoning, was released as OpenCyc under an open source license. More recently, Cyc has been made available to AI researchers under a research-purposes license as ResearchCyc.

Typical pieces of knowledge represented in the Cyc database are "Every tree is a plant" and "Plants die eventually". When asked whether trees die, the inference engine can draw the obvious conclusion and answer the question correctly. The Cyc KB contains over a million human-defined assertions, rules or common sense ideas. These are formulated in the language CycL, which is based on predicate calculus and has a syntax similar to that of the Lisp programming language.

An inference engine tries to derive answers from a KB. The inference engine is the "brain" that artificial intelligence systems use to reason about the information in the KB for the ultimate purpose of formulating new conclusions.

A knowledge base (KB) is a special kind of database for knowledge management. It provides the means for the computerized collection, organization, and retrieval of knowledge.

A truth maintenance system (TMS) is a knowledge representation method for representing both beliefs and their dependencies. The name truth maintenance is due to the ability of these systems to maintain and restore consistency. Many kinds of TMSs exist. Two major types are single-context and multi-context truth maintenance. In single context systems, consistency is maintained among all facts (database). Multi-context systems allow consistency to be relevant to a subset of facts (a context) according to the history of logical inference. This is achieved by tagging each fact or deduction with its logical history. Multi-agent TMSs perform truth maintenance across multiple memories which may be located on different machines.

As KBs become larger and larger, it is desirable to improve the performance of intermediate knowledge representations of the KB to improve the performance of the reasoning system, reduce the storage footprint, or both.

INCORPORATION BY REFERENCE

The following documents are incorporated herein by reference in their entirety: 1) McDermott, Contexts and data dependencies: A synthesis. IEEE Trans. on Pattern Analysis and Machine Intelligence, 5(3):237-246, May 1983, 2) Guha, Contexts: A Formalization and Some Applications, Ph.D. Thesis, Stanford University, 1995, 3) de Kleer, An assumption-based TMS. Artificial Intelligence, 28(2):127-162, 1986, 4) de Kleer, A hybrid truth maintenance system. PARC Technical Report, January 1992, and 5) U.S. Pat. No. 5,088,048 to Dixon et al.

BRIEF DESCRIPTION

In one aspect, a method for maintaining groupings and relationships of propositions associated with a knowledge base is provided. In one embodiment, the method includes: a) providing multiple microtheories arranged in a justification structure based on context relationships to form a knowledge base; b) providing an mt label for each microtheory; c) providing a proposition label for each proposition associated with the knowledge base; d) comparing the proposition label for a specific proposition associated with the knowledge base with the microtheory labels in response to a transaction request for the specific proposition; and e) determining which microtheory labels have a common element with the proposition label for the specific proposition based on the comparing.

In yet another embodiment, a method for maintaining groupings and relationships of propositions associated with a knowledge base includes: a) providing multiple microtheories arranged in a justification structure based on context relationships to form a knowledge base, the multiple microtheories including a first microtheory and a second microtheory in the justification structure such that the first microtheory inherits propositions associated with the second microtheory; b) providing an mt label for each microtheory; and c) initializing tags for the first and second microtheories to a clean value indicating that the corresponding microtheory labels do not need to be recalculated.

In yet another aspect, an apparatus for maintaining groupings and relationships of propositions associated with a knowledge base in provided. In one embodiment, the apparatus includes: one or more storage devices to store i) multiple microtheories arranged in a justification structure based on context relationships to form a knowledge base, the multiple microtheories including a first microtheory and a second microtheory in the justification structure such that the first microtheory inherits propositions associated with the second microtheory and ii) an mt label for each microtheory; and a tag processing logic to initialize tags for the first and second microtheories to a clean value indicating that the corresponding microtheory labels do not need to be recalculated.

DETAILED DESCRIPTION

Figure 1:
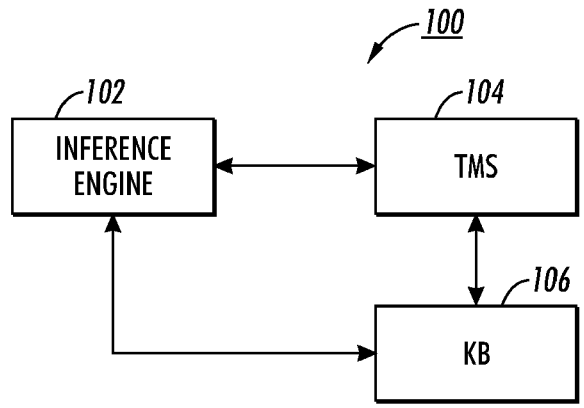
FIG. 1 is a block diagram of an exemplary embodiment of a reasoning system.

With reference to FIG. 1, an exemplary embodiment of a reasoning system 100 may include an inference engine 102, a truth maintenance system (TMS) 104, and a knowledge base (KB) 106. The reasoning system 100 may be viewed as a computational system that may range from a stand-alone computer system to a network, intranet, or internet of computers and peripheral devices in any suitable combination using any suitable combination of communication technologies to respond to queries or problems based on certain propositions (e.g., assertions, facts, beliefs) and relationships among these propositions in conjunction with certain reasoning rules (e.g., assumptions, dependencies, inferences, probabilities). The relationships among propositions may include various types of simplified representations of the propositions. The queries or problems may be received by the inference engine 102. The propositions may be collected in the KB 106. The relationships among propositions may be established and maintained by the TMS 104. The inference engine 102 may include the reasoning rules. The reasoning system 100 and constituent components depicted in FIG. 1 may be implemented using hardware, software, or firmware in any suitable combination.

In other embodiments, any combination of the inference engine 102, TMS 104, and KB 106 may each be viewed as a computational system that may range from a stand-alone computer system to a network, intranet, or internet of computers and peripheral devices in any suitable combination using any suitable combination of communication technologies. In one embodiment, the reasoning system 100 may include the Internet or portions thereof, particularly with respect to the KB 106.

Figure 2:
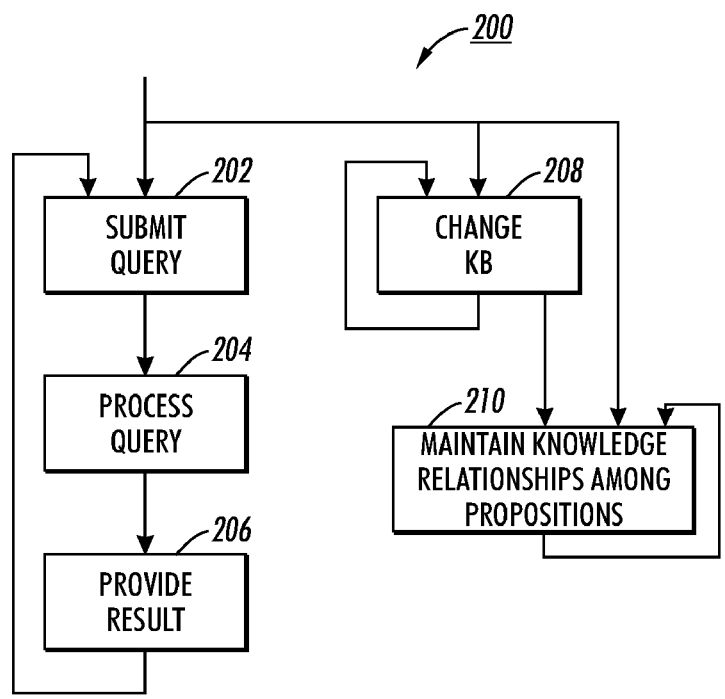
FIG. 2 is a flow chart of an exemplary embodiment of an operational process for an exemplary reasoning system.

With reference to FIG. 2, an exemplary embodiment of an operational process 200 for a reasoning system may start at 202 where a user may access the reasoning system and an inference engine to submit a query. An inference engine may process the query using a TMS to select information from a KB (204). At 206, the inference engine may provide the result to the user in a response. In another embodiment, an external process or external system may submit the query. In other embodiments, users, external processes, or external systems may submit a problem for solution or consideration.

As shown at 208, over time, the KB may be subject to continuous change, such as addition of new propositions or removal of existing propositions. Similarly, as shown at 210, the TMS may need to continuously maintain relationships among propositions in relation to the addition of new propositions or removal of existing propositions. Changes to the KB (208) and maintenance of relationships among propositions (210) may be in parallel to the query/results process (202-206). In other embodiments, the query/results process (202-206), changes to the KB (208), and maintenance of relationships among propositions (210) may be in any suitable series/parallel combination with respect to timing and sequence of operations. The process 200 and constituent components depicted in FIG. 2 may be implemented using hardware, software, or firmware in any suitable combination.

As knowledge bases become sufficiently large they may become inconsistent. For example, the WWW (i.e., the Internet) contains a massive amount of inconsistent information. Similarly, many people hold all sorts of inconsistent facts to be true in the real world. A problem is that inferences based on inconsistent propositions (e.g., assertions, facts, beliefs) may lead to unfounded beliefs and unnecessary ambiguities.

Historically, there have been several approaches to this challenge, such as using containers. In using containers, propositions may be organized into sets that, for example, have been referred to as contexts or microtheories. For additional information on contexts, see McDermott, Contexts and data dependencies: A synthesis. IEEE Trans. on Pattern Analysis and Machine Intelligence, 5(3):237-246, May 1983. For additional information on microtheories, see Guha, Contexts: A Formalization and Some Applications, Ph.D. Thesis, Stanford University, 1995. The entire disclosures of these McDermott and Guha documents are incorporated herein by reference.

For example, a set of propositions in a microtheory are intended to be logically consistent. Propositions in distinct microtheories may be inconsistent with each other. For example, microtheory mt1 may contain "Mandela is an elder statesman," while microtheory mt2 may contain "Mandela is a political prisoner." Using a dependency approach, each microtheory may be recorded as being dependent on another microtheory. This provides a lattice of microtheories with hierarchical relationships that may ground out in assumptions regarding certain is alcorresponding propositions. The TMS may ensure that each microtheory represents a set of consistent propositions. The TMS may also ensure that no inferences are drawn from inconsistent sets of propositions.

KBs may evolve. The information in KBs usually has some persistent characteristics, particularly information in larger KBs. In other words, the information is not necessarily lost after software (e.g., inference engine, TMS, database management system (DBMS)) that created it is no longer running (e.g., soft or hard termination under normal or abnormal circumstances). In one embodiment, a KB may be viewed as a persistent database with which the software (e.g., inference engine, truth maintenance system, database management system) interacts. KBs may evolve to extreme size, even larger than currently available. Accordingly, the reasoning system 100 or any of its constituent components (e.g., inference engine 102, TMS 104, or KB 106) may implement a scalable design architecture without inherent size limitations.

Various features of the TMS 104 are associated with microtheory operations and support cognitive architectures. Microtheory operations are part of the inner loop for inferencing algorithms used in the reasoning system 100 and inference engine 102. The FIRE (Flexible or Fast Inference Reasoning Engine) reasoning system by the Qualitative Reasoning Group at Northwestern University is an example of a large, persistent, knowledge representation, and reasoning system. Various embodiments of the TMS described herein may be used in the FIRE reasoning system, for example, to provide support for cognitive architectures.

Relationships (e.g., connections, dependencies) among microtheories for a KB may be expressed using predicates such as those used in the formal language CycL by CyCorp, Inc. of Austin, Tex. A genIMT predicate relates a first (e.g., more specific) microtheory with a second (e.g., more general) microtheory (e.g., (genIMT SPEC-MT GENL-MT)). For example, (genIMT mt1 mt2) indicates that every proposition that is true in microtheory mt2 is also true in microtheory mt1. In other words, microtheory mt1 inherits propositions from microtheory mt2. The genIMT predicate may provide a transitive relationship: Given (genIMT mt1 mt2) and (genIMT mt2 mt3) every fact true in mt3 also holds in mt1.

An ist predicate relates a microtheory to any sentence (e.g., proposition, assertion, fact, belief) that is true within the microtheory (e.g., (ist MT SENT)). For example, (ist mt p) indicates that proposition p is true in microtheory mt. Proposition p could either be asserted in microtheory mt or inherited by microtheory mt from another microtheory.

Based on the foregoing, add-genIMT, remove-genIMT, add-fact-to-mt, and remove-fact-from-mt predicates may be used to create or maintain a lattice structure of microtheories with hierarchical relationships that define a KB. For example, (add-genIMT mt1 mt2) may be used to add a lattice edge from microtheory mt2 to mt1 in hierarchical fashion. Conversely, (remove-genIMT mt1 mt2) may be used to remove the dependent relationship in the lattice from microtheory mt1 to microtheory mt2. The exemplary predicate (add-fact-to-mt fact mt) may be used to add proposition "fact" to microtheory mt. Notably, the proposition "fact" may already be true to microtheory mt by inheritance or prior addition. Conversely, (remove-fact-from-mt fact mt) may be used to remove the proposition "fact" from microtheory mt. Notably, the proposition "fact" may continue to be related to microtheory mt if it is inherited from another microtheory. The mts-of-fact command may be used to return any microtheories to which a specified proposition has been explicitly added. For example, (mts-of-fact fact) returns the microtheories to which the proposition "fact" has been explicitly added.

The inference engine 102 may utilize characteristics of the microtheories in the TMS 104 in conjunction with certain rules to deal with inconsistencies of propositions in the KB 106. This, in turn, may also provide consistency within a given microtheory while permitting inconsistency between microtheories. This may be implemented by establishing collections in the TMS 104 that identify propositions from the KB 106 that have some kind of natural common attribute. A genls predicate, for example, relates a given collection to those collections that subsume it. More specifically, (genls SUBCOL SUPERCOL) indicates that collection SUPERCOL is a supercollection of collection SUBCOL. In other words, anything that is a member of collection SUBCOL is also a member of collection SUPERCOL. An is a predicate, for example, relates things (e.g., propositions, assertions, facts, beliefs) of any kind to a given collection. More specifically, (is a THING COL) indicates that proposition THING is a member of the collection COL.

For example, an exemplary TMS 104 may include (genls Vampire MythologicalThing) and (is a LochNessMonster MythologicalThing) in relation to microtheory MainstreamAmericanCultureMt and (genls Vampire IntelligentAgent) and (is a LochNessMonster Reptile) in relation to microtheory WorldMythologicalMt. In microtheory MainstreamAmericanCultureMt, anything that is a member of collection Vampire is also a member of collection MythologicalThing and proposition LochNessMonster is a member of the collection MythologicalThing. In microtheory WorldMythologicalMt, anything that is a member of collection Vampire is also a member of collection IntelligentAgent and proposition LochNessMonster is a member of collection Reptile.

The TMS 104 may utilize a justification structure. These justifications may record the deduction of a fact (e.g., proposition) from other facts (e.g., propositions). For larger KBs 106, such justification structures may be of limited use because they are not localized in the database and would require extensive disk accesses in order to trace. Thus, instead of using the justification structure to justify a single proposition (e.g., assertion, fact, belief), the TMS may use the justification structure to encode microtheory relationships. There are far fewer microtheory relationships than dependency relationships in a typical knowledge base. One of FIRE's design principles is that only explicit rules detect contradictions, so there is no necessity for the TMS to detect contradictions.

The TMS 104 may be based at least in part on an ambiguity packing approach used in an Assumption-based TMS (ATMS) or a Hybrid TMS (HTMS). For additional information on the ATMS, see de Kleer, An assumption-based TMS. Artificial Intelligence, 28(2):127-162, 1986. For additional information on the HTMS, see de Kleer, A hybrid truth maintenance system. PARC Technical Report, January 1992. The entire disclosures of these de Kleer documents are incorporated herein by reference. From an ATMS perspective, a microtheory may be characterized as an ATMS assumption node. However, for the TMS disclosed herein there may only be one ATMS environment per node. Every genIMT predicate (e.g., (genIMT mt1 mt2)) may introduce a justification (e.g., mt2→mt1). The genIMT structure (e.g., lattice) for the TMS 104 may include cycles. Each microtheory may be identified by a label that specifies an environment that includes itself and other microtheories that it inherits from.

Figure 3:
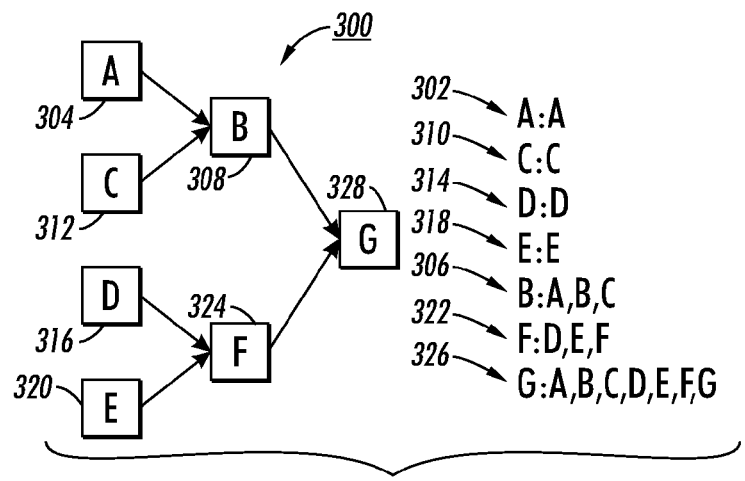
FIG. 3 is a hierarchical diagram of an exemplary embodiment of an intermediate knowledge representation of an exemplary knowledge base (KB)

FIG. 3 depicts an exemplary embodiment of a knowledge representation 300 resulting from six genIMT predicates as well as the corresponding justification and label structure. The genIMT predicates for this embodiment include (genIMT B A) (genIMT B C) (genIMT F D) (genIMT F E) (genIMT G B) (genIMT G F). The corresponding justification and label structure is {{A}} 302 for microtheory A 304, {{A,B,C}} 306 for microtheory B 308, {{C}} 310 for microtheory C 312, {{D}} 314 for microtheory D 316, {{E}} 318 for microtheory E 320, {{D,E,F}} 322 for microtheory F 324, and {{A,B,C,D,E,F,G}} 326 for microtheory G 328. The knowledge representation 300 and constituent components depicted in FIG. 3 may be implemented using hardware, software, or firmware in any suitable combination.

The microtheory justification structure of the TMS 104 is generally comparatively small in relation to the KB 106 so a duplicate instance of the justification structure may be resident in a working memory of the inference engine 102. Accordingly, retrieving genIMT information may not require access to a persistent store within the TMS 104 as it is locally cached.

Each proposition (e.g., assertion, fact, belief) may be identified by a label similar in form to the microtheory labels. The proposition labels may identify those microtheories to which the proposition has been explicitly added, for example, via an add-fact-to-mt predicate. Conversely, the remove-fact-from-mt predicate may simply remove the microtheory from the corresponding proposition label. A proposition holds true for a microtheory when the corresponding microtheory and proposition labels have a non-empty intersection. Use of the mts-of-fact predicate, for example, returns the microtheories to which the corresponding proposition has been explicitly added which provides the proposition label. Thus, the TMS 104 does not require a justification structure for propositions like some conventional TMSs.

With reference to FIG. 3, for example, suppose the following predicates are executed: (ist A fact), (ist G fact). The label of proposition "fact" is now {A,G}. Next, suppose (remove-fact-from-mt fact G) is executed. The label of proposition "fact" is now {A}. Proposition "fact" still holds true for microtheory G because the corresponding proposition and microtheory labels (i.e., {{A}} and {{A,B,C,D,E,F,G}}, respectively) have a common element (i.e., {A}).

The TMS 104 may update microtheory labels, for example, based on changes in the KB 106. In one embodiment, updates to individual microtheory labels may be delayed until there is some demand for the corresponding microtheory, such as a need to use the microtheory in conjunction with a query. In this embodiment, individual microtheory labels may not be fully constructed until they are needed. The TMS 104 may use tags for microtheories to support delayed updating of individual microtheory labels until they are referenced and thereby avoid needless computation. The tag may indicate a state of the microtheory label, for example, based on pertinent changes in the justification and label structure for the TMS 104 or changes in the KB 106. The microtheory label may include the tag or the tag may be independent from the label.

Figure 4:
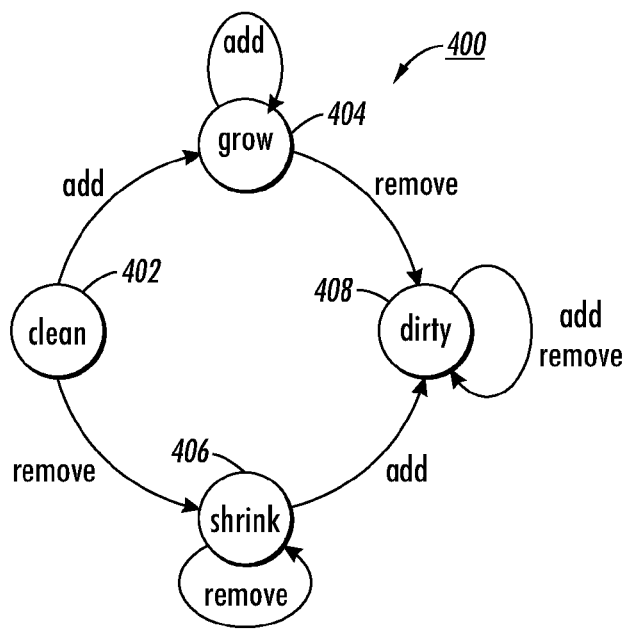
FIG. 4 is a state diagram for an exemplary embodiment of a component of an exemplary TMS.

As shown in FIG. 4, a state diagram 400 shows exemplary tags and corresponding states for a given microtheory, including clean 402, grow 404, shrink 406, and dirty 408. The microtheory tag may be set to clean 402 at some time when the current label for the microtheory is correct. For example, after a label is computed or recomputed the flag could be set to clean 402. If the microtheory is needed and its flag is set to clean 402, the microtheory may be used without re-computing its label. The grow state 404 may be viewed as a subset of the correct state 402 and the shrink state 406 may be viewed as a superset of the correct state 402.

As discussed above, a TMS may support both the addition and removal of microtheories using, for example, the genIMT predicate. The add-genIMT and remove-genIMT predicates may be used to transitively add or remove relationships between microtheories in the lattice of the TMS. For example, an add-genIMT predicate may add a relationship whereby an exemplary first microtheory inherits from another microtheory. Conversely, remove-genIMT predicate may remove a relationship whereby the exemplary first microtheory no longer inherits from yet another microtheory.

With reference to FIG. 4, from the clean state 402, the tag for the exemplary first microtheory would be changed from clean 402 to grow 404 if the next genIMT predicate adds an inheriting relationship to the first microtheory. Alternatively, from the clean state 402, if the next genIMT predicate removes an inheriting relationship from the first microtheory, the tag would be changed from clean 402 to shrink 406. From the shrink state 406, the tag for the exemplary first microtheory would be changed from shrink 406 to dirty 408 if the next genIMT predicate adds an inheriting relationship to the first microtheory. Similarly, from the grow state 404, if the next genIMT predicate removes an inheriting relationship from the first microtheory, the tag would be changed from grow 404 to dirty 408.

Based on the foregoing, if there is a query for absence of a particular proposition with respect to the microtheory and its flag is set to shrink 406, the microtheory may be used without re-computing its label. In other words, queries of the membership of a particular proposition in a microtheory can be optimized in the case where the corresponding microtheory and proposition labels have a non-empty intersection. A query for the absence of a proposition in a microtheory does not need a corresponding microtheory label to be updated if there is no common assumption in the microtheory and proposition labels and the microtheory tag is shrink 406.

Similarly, if there is a query for presence of a particular proposition with respect to the microtheory and its flag is set to grow 404, the microtheory may be used without re-computing its label. In other words, queries of the absence of a particular proposition in a microtheory can be optimized in the case where the corresponding microtheory and proposition labels have an empty intersection. A query for the presence of a proposition in a microtheory does not need a corresponding microtheory label to be updated if there is a common assumption in the microtheory and proposition labels and the microtheory tag is grow 404.

Conversely, if there is a query for presence of a particular proposition with respect to the microtheory and its flag is set to grow 404, the microtheory label should be re-computed before the microtheory is used. Similarly, if there is a query for absence of a particular proposition with respect to the microtheory and its flag is set to shrink 406, the microtheory label should be re-computed before the microtheory is used. If the microtheory is needed and its flag is set to dirty 408, the microtheory label should be re-computed before the microtheory is used. The state diagram 400 and constituent components depicted in FIG. 4 may be implemented using hardware, software, or firmware in any suitable combination.

As the genIMT structure contains cycles care must be taken that unfounded label be created. When cycles are present, they create microtheory equivalence classes.

In general, the various embodiments of a TMS described herein provide optimized ATMS/HTMS data structures. As in the ATMS/HTMS, most labels include few assumptions. Moreover, there are many possible data structures to represent the set of assumptions in a label. The various data structures can be represented as lists, arrays, bit-vectors, etc. Lists require little memory, but testing for the presence of an assumption in a set increases in relation to the size of the set. Bit-vector representations require more memory, but have the advantage that set membership is of constant cost. Another alternative is to use a hybrid way of representing assumption sets: For example, the set may be first encoded as a bit-vector and that vector may then be run length encoded with a size unit being the word size of the host hardware.

In one embodiment, the TMS 104 has been implemented in Common Lisp and integrated into the FIRE reasoning system using Common Lisp code and code from an ATMS implementation. This exemplary implementation was refined through extensive testing on large reasoning tasks and profiling the computation.

Figure 5:
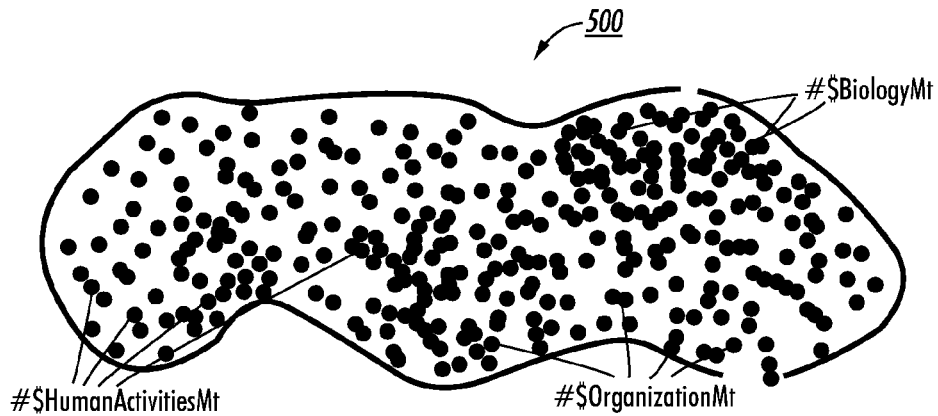
FIG. 5 is a diagram of an exemplary embodiment of a set of propositions (partially) grouped into microtheories.

With reference to FIG. 5, an exemplary set of propositions (partially) grouped into microtheories 500 may include a plurality of microtheories (or contexts). The microtheories can be viewed as containers that provide a way of grouping propositions and rules that have some common characteristic into sets. The propositions and rules in a given microtheory may share assumptions about a domain, level of detail, period in time, source, topic, etc. Each proposition in a KB occurs within at least one microtheory. This mt architecture provides a way for a reasoning system to handle global inconsistency within the KB. Moreover, the reasoning system can focus inference according to necessary detail. The mt's 500 and constituent components depicted in FIG. 5 may be implemented using hardware, software, or firmware in any suitable combination.

Although no contradictions are intended within a given microtheory, propositions in different microtheories may be inconsistent. For example, with respect to time, three microtheories (mt1, mt2, and mt3) may include the following propositions: mt1) Mandela is an elder statesman, mt2) Mandela is the President of South Africa, and mt3) Mandela is a political prisoner. Notably, these assertions may all be true but are inconsistent in relation to time because they cannot all be true for the same time. Similarly, with respect to granularity/domain, two microtheories (mt1 and mt2) may include the following propositions: mt1) tables are solid and mt2) tables are mostly space.

Figure 6:
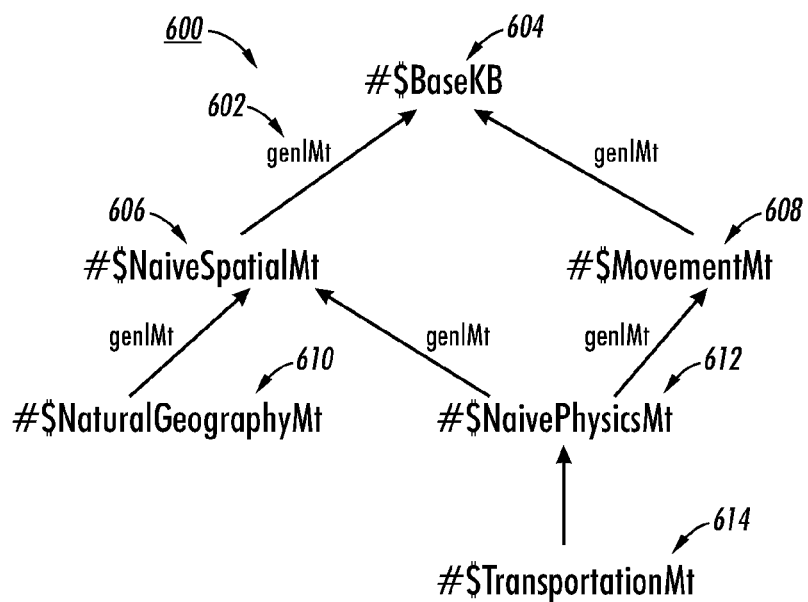
FIG. 6 is a hierarchical diagram of another exemplary embodiment of an intermediate knowledge representation of an exemplary KB.

With reference to FIG. 6, an exemplary knowledge representation 600 for a given KB may include a plurality of microtheories arranged in an inheritance hierarchy. The inheritance hierarchy, for example, may be defined by a plurality genlMt predicates 602. As shown, the microtheory BaseKB 604 is included in microtheory NaiveSpatialMt 606, microtheory MovementMt 608, microtheory NaturalGeographyMt 610, microtheory NaivePhysicsMt 612, and microtheory TransportationMt 614. Microtheory TransportationMt 614 inherits from microtheory NaivePhysicsMt 612. Microtheory NaturalGeographyMt 610 inherits from microtheory NaiveSpatialMt 606. Microtheory NaivePhysicsMt 612 inherits from both microtheory MovementMt 608 and microtheory NaiveSpatialMt 606. Microtheory BaseKB 604 is included in microtheories NaiveSpatialMt 606 and MovementMt 608. The knowledge representation 600 and constituent components depicted in FIG. 6 may be implemented using hardware, software, or firmware in any suitable combination.

Figure 7:
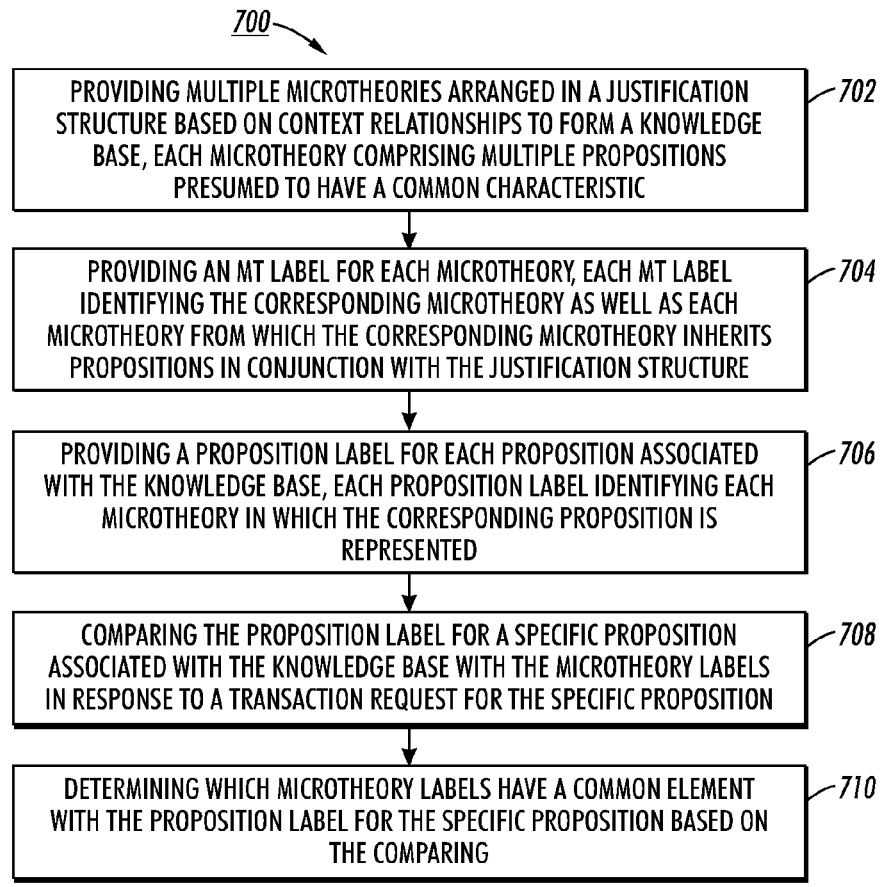
FIG. 7 is a flow chart of an exemplary embodiment of a process for maintaining groupings and relationships of propositions in conjunction with FIG. 3.

The foregoing discussion has described the concepts of the present application. Turning now to FIG. 7, a flow diagram setting forth a process 700 implementing those concepts is depicted. At 702 where multiple microtheories may be provided. The multiple microtheories are arranged in a justification structure based on context relationships to form a knowledge base. Each microtheory may comprise multiple propositions presumed to have a common characteristic. At 704, an mt label for each microtheory is provided. Each mt label identifying the corresponding microtheory as well as each microtheory from which the corresponding microtheory inherits propositions in conjunction with the justification structure. Next, a proposition label for each proposition associated with the knowledge base may be provided (706). Each proposition label identifying each microtheory in which the corresponding proposition is represented. At 708, the proposition label for a specific proposition associated with the knowledge base may be compared with the microtheory labels in response to a transaction request for the specific proposition. Next, the process may determine which microtheory labels have a common element with the proposition label for the specific proposition based on the comparing (710). The process 700 and constituent components depicted in FIG. 7 may be implemented using hardware, software, or firmware in any suitable combination. In one embodiment, the hardware includes an electronic processor in a computer system, where the processor is designed to operate software designed to perform the process described herein.

Figure 8:
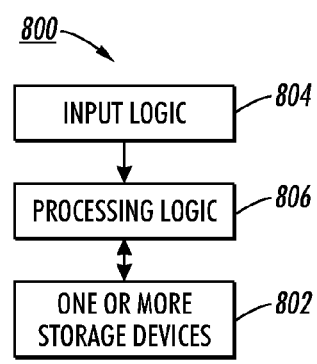
FIG. 8 is a block diagram of an exemplary embodiment of an apparatus for maintaining groupings and relationships of propositions in conjunction with FIG. 3.

With reference to FIG. 8, an exemplary embodiment of an apparatus 800 for maintaining groupings and relationships of propositions associated with a knowledge base in conjunction with various embodiments of reasoning systems described above (see, e.g., FIGS. 1-6) may include one or more storage devices 802, an input logic 804, and a processing logic 806.

The one or more storage devices 802 may store, for at least a time, i) multiple microtheories arranged in a justification structure based on context relationships to form a knowledge base, each microtheory comprising multiple propositions presumed to have a common characteristic, ii) an mt label for each microtheory, each mt label identifying the corresponding microtheory and each microtheory from which the corresponding microtheory inherits propositions in conjunction with the justification structure, and iii) a proposition label for each proposition associated with the knowledge base, each proposition label identifying each microtheory in which the corresponding proposition is represented.

The input logic 804 may receive a transaction request for a specific proposition associated with the knowledge base. The processing logic 806 may compare the proposition label for the specific proposition with the microtheory labels in response to the transaction request for the specific proposition and determine which microtheory labels have a common element with the proposition label for the specific proposition based on the comparing.

In another embodiment of the apparatus 800, the processing logic 806 may also update the proposition label for the specific proposition in response to the input logic 804 receiving another transaction request to add the specific proposition to another microtheory. In yet another embodiment of the apparatus 800, the processing logic 806 may also update the proposition label for the specific proposition in response to the input logic 804 receiving another transaction request to remove the specific proposition from a microtheory in which the specific proposition is currently represented.

In still another embodiment of the apparatus 800, the processing logic 806 may also return a current proposition label for the specific proposition in response to the input logic 804 receiving another transaction request for the proposition label of the specific proposition. In still yet another embodiment of the apparatus 800, the processing logic 806 may also update corresponding microtheory and proposition labels in response to the input logic 804 receiving another transaction request to add a specific microtheory to the justification structure.

In another embodiment of the apparatus 800, the processing logic 806 may also update corresponding microtheory and proposition labels in response to the input logic 804 receiving another transaction request to remove a specific microtheory from the justification structure. In yet another embodiment of the apparatus 800, the processing logic 806 may also update corresponding microtheory and proposition labels in response to the input logic 804 receiving another transaction request to add a context relationship between a specific microtheory and another microtheory in relation to the justification structure.

In still another embodiment of the apparatus 800, the processing logic 806 may also update corresponding microtheory and proposition labels in response to the input logic 804 receiving another transaction request to remove a context relationship between a specific microtheory and another microtheory in relation to the justification structure. In still yet another embodiment of the apparatus 800, the processing logic 806 may also return a current microtheory label for a specific microtheory in response to the input logic 804 receiving another transaction request for the microtheory label of the specific microtheory.

The apparatus 800 and constituent components depicted in FIG. 8 may be implemented using hardware, software, or firmware in any suitable combination. In one embodiment, the hardware includes an electronic processor in a computer system, where the processor is designed to operate software designed to perform the process described herein.

Figure 9:
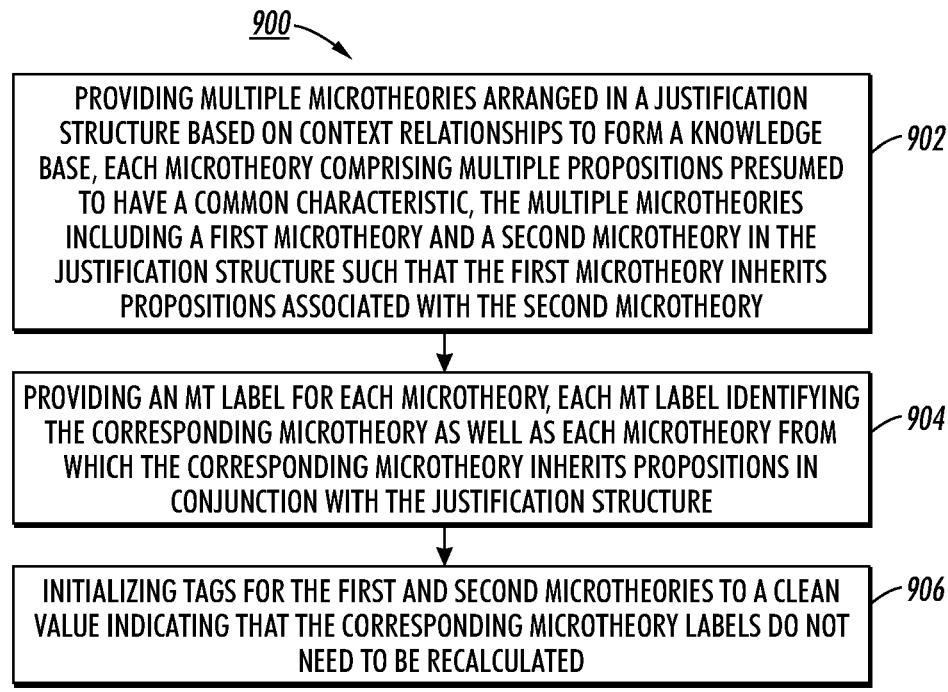
FIG. 9 is a flow chart of another exemplary embodiment of a process for maintaining groupings and relationships of propositions in conjunction with FIG. 4.

With reference to FIG. 9, an exemplary embodiment of a process 900 for maintaining groupings and relationships of propositions associated with a knowledge base in conjunction with various embodiments of reasoning systems described above (see, e.g., FIGS. 1-6) begins at 902 where multiple microtheories may be provided. The multiple microtheories may be arranged in a justification structure based on context relationships to form a knowledge base. Each microtheory may comprise multiple propositions presumed to have a common characteristic. The multiple microtheories may include a first microtheory and a second microtheory in the justification structure such that the first microtheory inherits propositions associated with the second microtheory. At 904, an mt label for each microtheory may be provided. Each mt label identifying the corresponding microtheory as well as each microtheory from which the corresponding microtheory inherits propositions in conjunction with the justification structure. Next, tags for the first and second microtheories may be initialized to a clean value indicating that the corresponding microtheory labels do not need to be recalculated (906).

In another embodiment, the tag for the first microtheory may be updated to a grow value indicating that the corresponding microtheory label would grow if it were recalculated. In yet another embodiment, the tag for the first microtheory may be updated to a shrink value indicating that the corresponding microtheory label would shrink if it were recalculated. In still another embodiment, the tag for the first microtheory may be updated to a dirty value indicating that the corresponding microtheory label needs to be recalculated. The process 900 and constituent components depicted in FIG. 9 may be implemented using hardware, software, or firmware in any suitable combination. In one embodiment, the hardware includes an electronic processor in a computer system, where the processor is designed to operate software designed to perform the process described herein.

Figure 10:
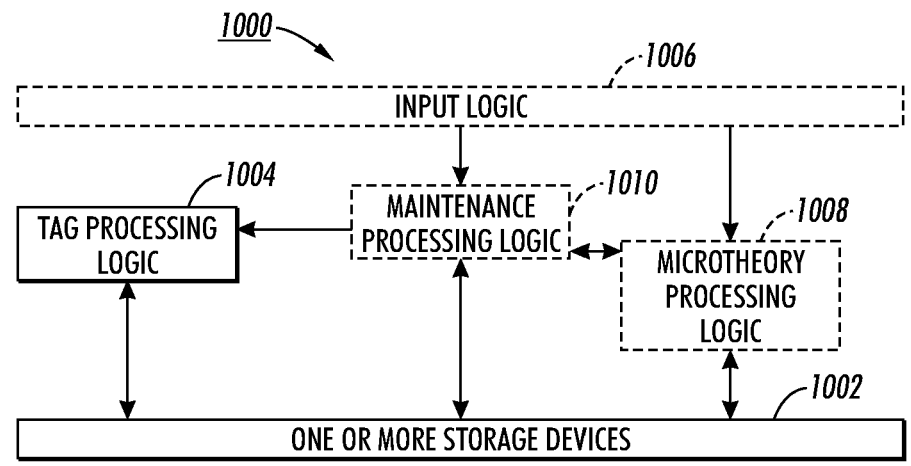
FIG. 10 is a block diagram of another exemplary embodiment of an apparatus for maintaining groupings and relationships of propositions in conjunction with FIG. 4.

With reference to FIG. 10, an exemplary embodiment of an apparatus 1000 for maintaining groupings and relationships of propositions associated with a knowledge base in conjunction with various embodiments of reasoning systems described above (see, e.g., FIGS. 1-6) may include one or more storage devices 1002 and a tag processing logic 1004. Other embodiments of the apparatus 1000 may include an input logic 1006, a microtheory processing logic 1008, a maintenance processing logic 1010, and a label processing logic 1012 in any suitable combination.

The one or more storage devices 1002 may store, for at least a time, i) multiple microtheories arranged in a justification structure based on context relationships to form a knowledge base, each microtheory comprising multiple propositions presumed to have a common characteristic, the multiple microtheories including a first microtheory and a second microtheory in the justification structure such that the first microtheory inherits propositions associated with the second microtheory and ii) an mt label for each microtheory, each mt label identifying the corresponding microtheory as well as each microtheory from which the corresponding microtheory inherits propositions in conjunction with the justification structure. The tag processing logic 1004 may initialize tags for the first and second microtheories to a clean value indicating that the corresponding microtheory labels do not need to be recalculated.

In another embodiment of the apparatus 1000, the tag processing logic 1004 may also update the tag for the first microtheory to a grow value indicating that the corresponding microtheory label would grow if it were recalculated. In yet another embodiment of the apparatus 1000, the tag processing logic 1004 may also update the tag for the first microtheory to a shrink value indicating that the corresponding microtheory label would shrink if it were recalculated.

In still another embodiment, the apparatus 1000 may also include the maintenance processing logic 1010, input logic 1006, and microtheory processing logic 1008. In this embodiment, the maintenance processing logic 1010 may add a context relationship between a third microtheory and the first microtheory in the justification structure such that the first microtheory inherits propositions associated with the third microtheory and remove a context relationship between the first and second microtheories in the justification structure such that the first microtheory no longer inherits propositions associated with the second microtheory. In the embodiment being described, the tag processing logic 1004 may also update the tag for the first microtheory to a dirty value indicating that the corresponding microtheory label needs to be recalculated. In this embodiment, the one or more storage devices 1002 may also store a proposition label for each proposition associated with the knowledge base. Each proposition label identifying each microtheory in which the corresponding proposition is represented. In the embodiment being described, the input logic 1006 may receive a transaction request for a specific proposition associated with the knowledge base. In this embodiment, the microtheory processing logic 1008 may check the tags for the first and second microtheories, determine the tag for the first microtheory is set to the dirty value and the tag for the second microtheory is set to the clean value, and compare the proposition label for the specific proposition with the microtheory labels for the first and second microtheories in response to the transaction request for the specific proposition after recalculating the microtheory label for the first microtheory.

The apparatus 1000 and constituent components depicted in FIG. 10 may be implemented using hardware, software, or firmware in any suitable combination. In one embodiment, the hardware includes an electronic processor in a computer system, where the processor is designed to operate software designed to perform the process described herein.

The various embodiments of an mt described herein may implement persistent storage of certain characteristics of microtheories and propositions, such as proposition labels, results returned from mts-of-fact predicates, microtheory labels, and microtheory tags. This facilitates faster maintenance of the characteristics and improved performance for the corresponding reasoning system. This persistent storage may be implemented in a manner that reduces paging and the memory footprint for the mts.

The various embodiments of a method and apparatus disclosed herein may be used to maintain many very large sets of consistent facts by applying certain techniques described herein to represent propositions of a KB in a plurality of microtheories. This may provide an effective approach to efficiently maintaining and accessing large knowledge bases structured as microtheories and connected by lattices of dependencies. In other words, the various methods and apparatus disclosed herein may be used to maintain many very large sets of consistent facts efficiently. As described above, TMSs may be used to represent the members (e.g., propositions, assertions, facts, beliefs) of a KB in a plurality of microtheories.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for maintaining groupings and relationships of propositions associated with a knowledge base, comprising:
   a) providing multiple microtheories arranged in a justification structure based on context relationships to form a knowledge base, each microtheory comprising multiple propositions presumed to have a common characteristic;
   b) providing a microtheory label for each microtheory, each microtheory label identifying the corresponding microtheory as well as each microtheory from which the corresponding microtheory inherits propositions in conjunction with the justification structure;
   c) providing a proposition label for each proposition associated with the knowledge base, each proposition label identifying each microtheory in which the corresponding proposition is represented;
   d) comparing the proposition label for a specific proposition associated with the knowledge base with the microtheory labels in response to a transaction request for the specific proposition; and
   e) determining which microtheories have a non-empty intersection with the specific proposition based on the comparing.

2. The method set forth in claim 1, further comprising:
   f) updating the proposition label for the specific proposition in response to receiving another transaction request to add the specific proposition to another microtheory.

3. The method set forth in claim 1, further comprising:
   f) updating the proposition label for the specific proposition in response to receiving another transaction request to remove the specific proposition from a microtheory in which the specific proposition is currently represented.

4. The method set forth in claim 1, further comprising:
   f) returning a current proposition label for the specific proposition in response to receiving another transaction request for the proposition label of the specific proposition.

5. The method set forth in claim 1, further comprising:
   f) updating corresponding microtheory and proposition labels in response to receiving another transaction request to add a specific microtheory to the justification structure.

6. The method set forth in claim 1, further comprising:
   f) updating corresponding microtheory and proposition labels in response to receiving another transaction request to remove a specific microtheory from the justification structure.

7. The method set forth in claim 1, further comprising:
   f) updating corresponding microtheory and proposition labels in response to receiving another transaction request to add a context relationship between a specific microtheory and another microtheory in relation to the justification structure.

8. The method set forth in claim 1, further comprising:
   f) updating corresponding microtheory and proposition labels in response to receiving another transaction request to remove a context relationship between a specific microtheory and another microtheory in relation to the justification structure.

9. The method set forth in claim 1, further comprising:
   f) returning a current microtheory label for a specific microtheory in response to receiving another transaction request for the microtheory label of the specific microtheory.

10. A method for maintaining groupings and relationships of propositions associated with a knowledge base, comprising:
    a) providing multiple microtheories arranged in a justification structure based on context relationships to form a knowledge base, each microtheory comprising multiple propositions presumed to have a common characteristic, the multiple microtheories including a first microtheory and a second microtheory in the justification structure such that the first microtheory inherits propositions associated with the second microtheory;
    b) providing a microtheory label for each microtheory, each microtheory label identifying the corresponding microtheory as well as each microtheory from which the corresponding microtheory inherits propositions in conjunction with the justification structure; and
    c) initializing tags for the first and second microtheories to a clean value indicating that the corresponding microtheory labels do not need to be recalculated.

11. The method set forth in claim 10, further including:
    d) providing a proposition label for each proposition associated with the knowledge base, each proposition label identifying each microtheory in which the corresponding proposition is represented;
    e) receiving a transaction request for a specific proposition associated with the knowledge base;
    f) checking the tags for the first and second microtheories and determining both are set to the clean value; and
    g) comparing the proposition label for the specific proposition with the microtheory labels for the first and second microtheories in response to the transaction request for the specific proposition without recalculating the corresponding microtheory labels.

12. The method set forth in claim 10, further including:
    d) adding a context relationship between a third microtheory and the first microtheory in the justification structure such that the first microtheory inherits propositions associated with the third microtheory;
    e) updating the tag for the first microtheory to a grow value indicating that the corresponding microtheory label would grow if it were recalculated;
    f) providing a proposition label for each proposition associated with the knowledge base, each proposition label identifying each microtheory in which the corresponding proposition is represented;
    g) receiving a transaction request for presence of a specific proposition associated with the knowledge base;
    h) checking the tags for the first and second microtheories and determining the tag for the first microtheory is set to the grow value and the tag for the second microtheory is set to the clean value; and
    i) comparing the proposition label for the specific proposition with the microtheory labels for the first and second microtheories in response to the transaction request for the specific proposition without recalculating the corresponding microtheory labels.

13. The method set forth in claim 12, further including:
    j) receiving a transaction request for absence of another proposition associated with the knowledge base;
    k) checking the tags for the first and second microtheories and determining the tag for the first microtheory is set to the grow value and the tag for the second microtheory is set to the clean value; and
    l) comparing the proposition label for the another proposition with the microtheory labels for the first and second microtheories in response to the transaction request for the another proposition after recalculating the microtheory label for the first microtheory.

14. The method set forth in claim 10, further including:
    d) removing a context relationship between the first and second microtheories in the justification structure such that the first microtheory no longer inherits propositions associated with the second microtheory;
    e) updating the tag for the first microtheory to a shrink value indicating that the corresponding microtheory label would shrink if it were recalculated;
    f) providing a proposition label for each proposition associated with the knowledge base, each proposition label identifying each microtheory in which the corresponding proposition is represented;
    g) receiving a transaction request for absence of a specific proposition associated with the knowledge base;
    h) checking the tags for the first and second microtheories and determining the tag for the first microtheory is set to the shrink value and the tag for the second microtheory is set to the clean value; and
    i) comparing the proposition label for the specific proposition with the microtheory labels for the first and second microtheories in response to the transaction request for the specific proposition without recalculating the corresponding microtheory labels.

15. The method set forth in claim 14, further including:
    j) receiving a transaction request for presence of another proposition associated with the knowledge base;
    k) checking the tags for the first and second microtheories and determining the tag for the first microtheory is set to the shrink value and the tag for the second microtheory is set to the clean value; and
    l) comparing the proposition label for the another proposition with the microtheory labels for the first and second microtheories in response to the transaction request for the another proposition after recalculating the microtheory label for the first microtheory.

16. The method set forth in claim 10, further including:
    d) adding a context relationship between a third microtheory and the first microtheory in the justification structure such that the first microtheory inherits propositions associated with the third microtheory and removing a context relationship between the first and second microtheories in the justification structure such that the first microtheory no longer inherits propositions associated with the second microtheory;
    e) updating the tag for the first microtheory to a dirty value indicating that the corresponding microtheory label needs to be recalculated;
    f) providing a proposition label for each proposition associated with the knowledge base, each proposition label identifying each microtheory in which the corresponding proposition is represented;
    g) receiving a transaction request for a specific proposition associated with the knowledge base;
    h) checking the tags for the first and second microtheories and determining the tag for the first microtheory is set to the dirty value and the tag for the second microtheory is set to the clean value; and
    i) comparing the proposition label for the specific proposition with the microtheory labels for the first and second microtheories in response to the transaction request for the specific proposition after recalculating the microtheory label for the first microtheory.

17. An apparatus for maintaining groupings and relationships of propositions associated with a knowledge base, comprising:
    one or more non-transitory computer-readable medium to store, for at least a time, i) multiple microtheories arranged in a justification structure based on context relationships to form a knowledge base, each microtheory comprising multiple propositions presumed to have a common characteristic, the multiple microtheories including a first microtheory and a second microtheory in the justification structure such that the first microtheory inherits propositions associated with the second microtheory and ii) a microtheory label for each microtheory, each microtheory label identifying the corresponding microtheory as well as each microtheory from which the corresponding microtheory inherits propositions in conjunction with the justification structure; and
    a tag processing logic to initialize tags for the first and second microtheories to a clean value indicating that the corresponding microtheory labels do not need to be recalculated.

18. The apparatus set forth in claim 17 wherein the one or more storage devices are also for storing a proposition label for each proposition associated with the knowledge base, each proposition label identifying each microtheory in which the corresponding proposition is represented, the apparatus further including:
    an input logic to receive a transaction request for a specific proposition associated with the knowledge base; and
    a microtheory processing logic to check the tags for the first and second microtheories, determine both are set to the clean value, and compare the proposition label for the specific proposition with the microtheory labels for the first and second microtheories in response to the transaction request for the specific proposition without recalculating the corresponding microtheory labels.

19. The apparatus set forth in claim 17, further including:
    a maintenance processing logic to add a context relationship between a third microtheory and the first microtheory in the justification structure such that the first microtheory inherits propositions associated with the third microtheory;
    wherein the tag processing logic is also for updating the tag for the first microtheory to a grow value indicating that the corresponding microtheory label would grow if it were recalculated and the one or more storage devices are also for storing a proposition label for each proposition associated with the knowledge base, each proposition label identifying each microtheory in which the corresponding proposition is represented;
    the apparatus further including:
    an input logic to receive a transaction request for presence of a specific proposition associated with the knowledge base; and
    a microtheory processing logic to check the tags for the first and second microtheories, determine the tag for the first microtheory is set to the grow value and the tag for the second microtheory is set to the clean value, and compare the proposition label for the specific proposition with the microtheory labels for the first and second microtheories in response to the transaction request for the specific proposition without recalculating the corresponding microtheory labels.

20. The apparatus set forth in claim 17, further including:
    a maintenance processing logic to remove a context relationship between the first and second microtheories in the justification structure such that the first microtheory no longer inherits propositions associated with the second microtheory;

wherein the tag processing logic is also for updating the tag for the first microtheory to a shrink value indicating that the corresponding microtheory label would shrink if it were recalculated and the one or more storage devices are also for storing a proposition label for each proposition associated with the knowledge base, each proposition label identifying each microtheory in which the corresponding proposition is represented;

the apparatus further including:
- an input logic to receive a transaction request for absence of a specific proposition associated with the knowledge base; and
- a microtheory processing logic to check the tags for the first and second microtheories, determine the tag for the first microtheory is set to the shrink value and the tag for the second microtheory is set to the clean value, and compare the proposition label for the specific proposition with the microtheory labels for the first and second microtheories in response to the transaction request for the specific proposition without recalculating the corresponding microtheory labels.

21. The method set forth in claim 1 wherein microtheories have non-empty intersections with the specific proposition where the proposition label for the specific proposition identifies the corresponding microtheory as one in which the specific proposition is represented.

22. The method set forth in claim 1 wherein microtheories have non-empty intersections with the specific proposition where the microtheory label for the corresponding microtheory identifies at least one microtheory identified in the proposition label for the specific proposition.

* * * * *